July 10, 1962     H. G. HONIG     3,044,037
HIGH VOLTAGE DISCONNECT SPLICE HEAD
Filed May 27, 1960
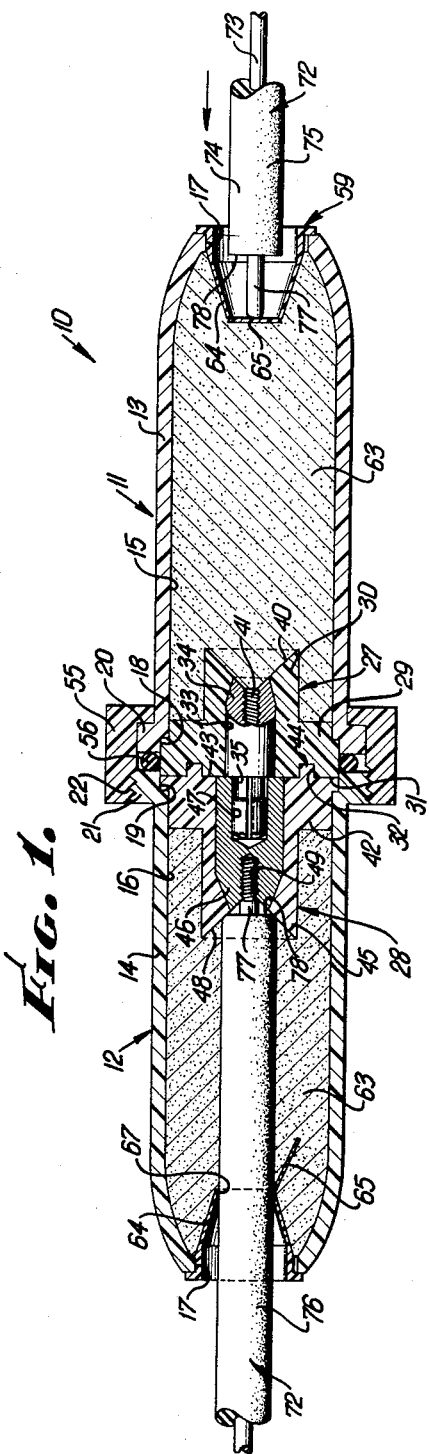
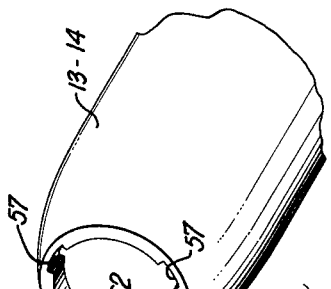
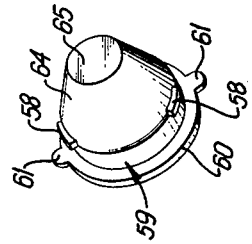
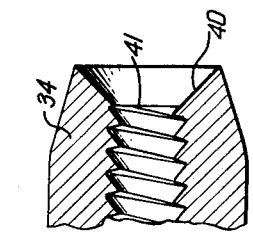
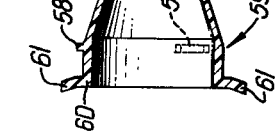
INVENTOR.
HERBERT G. HONIG
BY
ATTORNEY.

United States Patent Office 3,044,037
Patented July 10, 1962

3,044,037
HIGH VOLTAGE DISCONNECT SPLICE HEAD
Herbert G. Honig, 4339 San Rafael Ave.,
Los Angeles, Calif.
Filed May 27, 1960, Ser. No. 32,249
3 Claims. (Cl. 339—89)

This invention relates to the art of splicing high voltage electric cables. It is common practice in the installation of such cables to provide disconnect splice heads for splicing adjacent ends of a cable where there is a break necessary in the latter. The splice heads formerly used require special tools and procedures in applying these to the cable ends which ran up the labor cost of splicing a cable.

It is an object of the present invention to provide a high voltage disconnect splice head which has a dielectric strength equal or superior to the heads in common use but which may be applied to the cable ends to be spliced with relative ease and with a great saving of labor cost over that previously necessary.

In the splice heads formerly in common use the two halves or sub-heads of the splice head included outer shells into which the cable ends were extended, and these shells were filled with a liquid thermoplastic insulating material on the job as a part of the process of connecting the cable ends to the splice head. This necessity required equipment on the job for heating this material.

It is another object of the invention to provide a high voltage disconnect splice head which contains within itself a suitable fluid insulation material when it is manufactured and which is sealed against escape so that the splice head arrives on the job already provided with this necessary fluid insulating material thereby eliminating the need of introducing such material into the splice head on the job.

It is a further object of the invention to provide a high voltage disconnect splice head in which the fluid insulating medium is introduced into each sub-head thereof through a hole in the end thereof and is sealed in place by a diaphragm which may be readily penetrated by a cable end in applying a sub-head thereto.

It is still another object of the invention to provide such a splice head in which the fluid insulating material contained in the sub-heads has the characteristic of hardening when escaping into contact with the atmosphere so as to automatically form a seal between the cable and the aperture formed in the diaphragm penetrated by said cable thus preventing further escape of the insulating material.

The high voltage cables which these splice heads are used to connect contain a single solid copper rod as the conductor thereof which is located at the center of a thick cylindrical sheathing of neoprene or the like. It has heretofore been the custom in connecting a cable end to a splice sub-head, to bare an end portion of the copper conductor of the cable which is then inserted into a receptacle fitted with screws which are screwed inwardly against the bare conductor to hold this in place and make a good electrical contact therewith. An alternate prior practice has been to solder the conductor of the cable to the conducting socket of the sub-head it is being attached to.

I have discovered that the use of radially disposed screws for fastening the cable conductor to the sub-head impairs the dielectric strength of the splice head. Furthermore either of these prior methods of connecting a cable conductor to the conducting receptacle therefor on the sub-head requires that direct access be had by the mechanic performing the task to the sub-head conducting receptacle. This necessitates the disassembly of a sub-head by this mechanic in the process of connecting the cable thereto.

It is a yet further object of the invention to provide a high voltage disconnect splice head in which disassembly of a sub-head thereof in order to connect the same to a cable end is unnecessary thus eliminating the labor involved in such a disassembly.

It is a still further object of the invention to provide such a splice head in which the use of screws or solder in connecting the cable to the respective sub-heads are eliminated.

Still another object of the invention is the provision of such a splice head in which a highly satisfactory union of the cable conductor with the conducting receptacle of a sub-head thereof may be performed merely by thrusting the cable end, with a short portion of the conductor thereof laid bare, through the opening for receiving the cable at the end of the sub-head and then rotating the sub-head relative to the cable.

The manner of accomplishing the foregoing objects as well as further objects and advantages will be made manifest in the following description taken in connection with the accompanying drawings in which:

FIG. 1 is a diagrammatic longitudinal sectional view through a preferred embodiment of the invention and illustrating the male sub-head thereof just prior to a cable end being connected thereto and the female sub-head thereof after a cable end has been connected thereto.

FIG. 2 is an exploded perspective view of the filler opening of one of the sub-heads of the invention together with the diaphragm plug for closing said filler opening after said shell has been filled with fluid dielectric material.

FIG. 3 is an enlarged longitudinal sectional view through one of the diaphragm plugs of the invention, which illustrates how this is made so as to be rupturable by a cable end in applying this to one of the sub-heads of the invention.

FIG. 4 is a diagrammatic enlarged fragmentary sectional view of one of the tapped holes of the invention for receiving a cable conductor and illustrates the non-reversible character of the threads in said hole.

Referring specifically to the drawings, the invention is there shown as embodied in a splice head 10 which includes sub-heads 11 and 12. These sub-heads have hard cylindrical plastic shells 13 and 14 providing chambers 15 and 16 formed concentrically respectively therein. At their outer ends the shells 13 and 14 are bullet-nosed in shape and terminate in cable receiving filler openings 17. At their inner ends, the chambers 15 and 16 terminate in counterbores 18 and 19. Formed externally on the inner ends of shells 13 and 14 are short annular flanges 20 and 21, the first of which has a smooth periphery while the latter of these is provided with threads 22. It is to be noted that the shells 13 and 14 are identical excepting for the provision of the threads 22 on annular flange 21. This introduces a substantial economy in the production of the splice head 10 by virtue of the fact that both shells can be made from a single die having a replaceable element for molding the threads 22.

The inner ends of chambers 15 and 16 are closed by two interfitting conductive connection means 27 and 28 which are adapted for temporary electric connection with each other. The means 27 includes a hard plastic body 29 having a maximum diameter which fits into the counterbore 18, an intermediate diameter which fits into the chamber 15 and a still smaller diameter provided by an outer extension 30. The body 29 has an inner flat radial end face 31 provided with an annular groove 32. The body 29 has a concentric bore 33 which is provided by casting the body 29 about a cylindrical metallic element 34 having a male connector 35 extending axially from the inner end thereof. A concave conical guide surface 40 is formed in the outer end of the extension 30 and metallic element 34, this terminating at its center in an axial tapped hole 41 formed in the element 34. As shown in detail in FIG. 4, the threads in hole 41 are of the irreversible type which prevent an element screwed into these threads from being unscrewed therefrom by merely pulling on said element.

The connection means 27 is permanently secured in closing relation with the inner end of the chamber 15 by being cemented to the shell 13 at the annular interfitting surfaces where the body 29 and said shell meet.

The connection means 28 includes the same general elements as the connection means 27 but is shaped to interfit with the latter to form a well shielded electrical connection therewith. Thus, the connection means 28 has a hard molded plastic body 42 which fits into and is cemented permanently in the inner end of chamber 16 and counterbore 19 and has an inner radial flat face 43 which fits flat against the face 31 of connection means 27, and is provided with a concentric annular ridge 44 which fits precisely in the coaxial annular groove 32 of the plastic body 29.

The body 42 includes an outward concentric extension 45 and this body is molded about a coaxially disposed metallic element 46 having a concentric hole 47 at its inner end for receiving the male connector 35 of the connection means 27. A concave conical guide surface 48 is formed in the outer end of the extension 45 and in metallic element 46 to terminate in an axial tapped hole 49 provided in the element 46, the threads in which are similar to those, above described, in hole 41.

The splice head 10 is provided with a hard plastic internally threaded bonnet 55 which is extended over the shell 13 and screwed onto the threads 22 so as to temporarily but firmly unite the sub-heads 11 and 12 in face-to-face relation in which the axial faces 31 and 43 are tightly pressed together with the annular ridge 44 fitting into and filling the annular recess 32. It will be noted that when the sub-heads 11 and 12 are thus assembled the radial plane in which the faces 31 and 43 meet lies inside the counterbore 19 of the sub-head 12 so as to supplement the labyrinth provided by the interfitting annular surfaces of the dielectric plastic bodies 29 and 42 which obstructs the escape of electricity from the metallic connector elements 34 and 46 to the exterior of the splice head 10.

Access of moisture to this labyrinth is prevented by the provision of a soft neoprene O-ring 56 which makes annular contact with and is compressed between the juxtaposed inner ends of the shells 13 and 14 when the splice head 10 is assembled as shown in FIG. 1.

While the cable receiving opening 17 may be made of a suitable size to neatly receive a cable of any particular outside diameter with which the splice head 10 is to be used, these openings in the embodiment disclosed herein are made larger than the maximum outside diameter of cable adapted to be connected by this splice head 10 and are provided with three notches 57 for the reception of lugs 58 provided to extend outwardly from a hollow soft plastic plug 59 which is molded to fit the opening 17 and have an external flange 60 which overlies the outer ends of the shells 13 and 14.

The annular flange 60 is provided with a pair of ears 61 which lie in the plane of said flange and are useful in rotating the hollow plug 59 in one of the openings 17 for shifting the lugs 58 out of alignment with the notches 57 so as to be disposed opposite radial surfaces 62 formed internally on the shells 13 and 14 between the notches 57. When so installed in the openings 17 of the shells 13 and 14, the plugs 59 close the chambers 15 and 16 of these shells.

It is thus possible to provide each of the sub-heads 11 and 12 of the splice head 10 of the present invention with a heavy fluid dielectric insulating material 63 at the time the splice head 10 is manufactured and confine this material in said splice head by inserting the plugs 59 into the openings 17 after the chambers 15 and 16 of the sub-heads 11 and 12 have thus been filled with this material.

The molded plastic plugs 59 are hollow and made of a yieldable plastic material with a thin frusto-conical wall 64 extending inwardly therefrom and terminating in a thin diaphragm 65 which is joined to the wall 64 by a still thinner web 66 which surrounds the diaphragm 65 and permits the latter to be breached along the line of said web and in fact practically separated from the inner end of the wall 64 by applying pressure against this diaphragm from a cable end. An opening 67 is thus formed at the inner end of the frusto-conical wall 64 the diameter of which opening is equal to the outside diameter of the smallest cable with which the splice head 10 is adapted to be used.

*Operation*

When the splice head 10 of the present invention thus arrives on a job the chambers 15 and 16 thereof are filled with a heavy fluid dielectrical material 63 which is confined in these chambers by plugs 59 being inserted in the openings 17 with the lugs 58 extending through the notches 57 and the plugs being rotated to turn the lugs 58 opposite the radial surfaces 62 thereby securing these plugs in place and preventing any leakage of the material 63.

It is here to be noted that the cable 72, with which the splice head 10 is adapted to be used, includes a relatively heavy solid metallic conductor 73 which is generally made of copper or other relatively soft highly conductive metal, and this conductor is surrounded by a thick cylindrical flexible insulating sheath 74 which is preferably made of neoprene or other similar material of high dielectric and weather-resistant qualities. It is also to be noted that the metal of which elements 34 and 46 are made is preferably brass of such a composition as makes this substantially harder than the metal comprising the conductor 73 of the cable 72.

In preparing two ends 75 and 76 of a cable 72 for joining by the splice head 10, a terminal portion 77 of the conductor 73 of each cable end 75 and 76 is bared by cutting away the insulation sheathing 74 for about a half inch at the end of the cable end, to provide a flat radial face 78 at the end of the sheathing 74 on each of the cable ends.

After thus preparing the cable ends 75 and 76, the splice head 10 is separated into the two sub-heads 11 and 12 by unscrewing the bonnet 55 and pulling the male connector 35 from the hole 47. With the sub-heads thus separated, the sub-head 11 is taken in one hand and cable end 75 in the other and the cable end 75 inserted in the hollow plastic plug 59 of that sub-head against the diaphragm 65 thereof and then pushed inwardly to open this diaphragm by rupturing the web 66 practically entirely around the diaphragm and pushing the diaphragm inwardly into the dielectric fluid 63 trapped in said subhead. This inward movement of the cable end 75 is continued until the terminal conductor portion 77 thereof engages the conical guide surface 40 and is guided into centralized relation with the tapped hole 41. Upon this movement being completed, the sub-head 11 is rotated about its axis while maintaining a slight inward pressure on the cable end 75, which results in the simultaneous cutting of threads on the conductor terminal 77 and the screwing of this terminal into the tapped hole 41 of the connector element 34. This operation concludes with the end face 78 of the insulation sheathing 74 of the cable end 75 being pressed tightly against the dielectric plastic portion of the concave guiding surface 40 of the connection means 27, thus forming a dielectric seal between the metallic element 34 and the conductor terminal portion 77, on the one hand, and the body of fluid dielectric material 63 on the other. It also forms an excellent electrical connection between the cable end conductor 73 and the metallic connection element 34.

In order to illustrate in FIG. 1 two steps in the operation of assembling one of the sub-heads of the splice head 10 with a cable end, the cable end 75 is shown in this view positioned as when it is first inserted into the opening 17 of the sub-head 11 and before this insertion has proceeded far enough to rupture the diaphragm 65 of this sub-head. The final result of assembling the cable end 75 with sub-head 11 is illustrated, however, at the other end of this view where the cable end 76 is shown as it appears after the completion of its being united with the sub-head 12 of the splice head 10. As already noted, the assembly of a cable end with one of the sub-heads of the splice head 10 is performed while the sub-heads are separated and then after each of the cable ends has been united with its respective sub-head as the cable end 76 is shown as united with the sub-head 12 on the left side of FIG. 1, the two sub-heads are then united by inserting the male member 35 into the hole 47 until the radial faces 31 and 43 are brought into flush relation with O-ring 56 disposed between the juxtaposed ends of the shells 13 and 14, and the bonnet ring 55 then advanced over the flange 20 and screwed onto the threads 22 on the flange 21 of sub-head 12.

As the diameter of the hole 67 formed in each of the plugs 59 by the insertion of a cable end through this plug is equal to the outside diameter of the smallest cable for use with which the splice head 10 is furnished, these holes snugly fit the sheathing 74 of any of the cables inserted therein so as to prevent an excessive outward leakage of the liquid dielectric material 63 after the cable splicing operation above described is completed. If the splice head 10 is used to unite cable ends of a larger outside diameter but within the range of cable diameters with which the splice head 10 is suitable for use, the yieldable frusto-conical wall 64 of the respective plugs 59 merely expands to allow the cable ends to pass therethrough thereby making a still tighter fit between the plugs 59 and the cable sheathing 74 and preventing excessive escape of the dielectric liquid 63 from the splice head.

To guard against a possible escape from the sub-heads 11 and 12 of the dielectric liquid 63 contained therein after the splice head 10 has been used to splice a pair of cable ends, the present invention also includes the feature of rendering the fluid dielectric material 63 subject to hardening upon its contact with the atmosphere. Thus, so long as this dielectric fluid is confined in the sub-heads, it remains in a fluid condition and yields to permit the cable ends to be inserted through this material, and yet any portion of this liquid which escapes outwardly around the cable ends, when these are inserted through the hollow plugs 59, hardens upon contact with the atmosphere so as to form a seal in the space between the cable and the inner surfaces of the plugs 59 which packs off any opening which might exist between these plugs and the cable sheathing 74 and prevents further escape of material 63 from the sub-heads.

The hard plastic elements of the splice head 10 including the plastic shells 13 and 14, the plastic bodies 29 and 42 and the bonnet 55 may be made of any hard plastic material of high dielectric character. One such material which has been found suitable for this use is cycolac which is a new resinous polymer configuration in which the central material is styrene.

The fluid dielectric insulating material 63 is preferably sufficiently fluid in character so as to seek its own level and allow air bubbles therein to escape upwardly therethrough by gravity thereby assuring against air bubbles being left in this material when sub-heads of the splice head 10 are filled therewith. Dielectric liquids of various types may be used for this purpose but in the present invention it has proved preferable to use a composition comprising a mixture of blown soya oil and powdered calcium carbonate and approximately 6% of powdered cobalt. Blending these ingredients produces a vinyl type of material which though sufficiently fluid to seek its own level, is relatively viscous and through the action of the cobalt incredient thereof congeals when exposed to air so as to seal off the space between the cable sheathing and the plugs 59 thus preventing undue escape of the material 63 after the splicing of a cable.

While only a single embodiment of the invention has been disclosed and described herein, it is to be understood that various changes may be made in this without departing from the spirit of the invention or the scope of the appended claims.

The claims are:

1. In a high voltage electric cable splice head, the combination of: two subheads having two interfitting conductive connection means adapted for temporary electric connection with each other, each subhead having a relatively thin-walled elongated shell in one end of which one of said connection means is mounted; means for temporarily uniting said shells with said two connection means in electric connection with each other, and with said shell ends, aforesaid, in abutting end-to-end sealed relation, said shells having openings at their other ends for admitting cable ends to be spliced into said shells, said cable including a central metallic conductor surrounded by an insulating sheathing, said conductor extending beyond said sheathing a short distance at said cable ends; tapped axial metal sockets provided respectively on said two connection means, said sockets being of a harder metal than said conductors so as to cut threads in the latter and electrically connect said cable ends to said respective connection means when said cable ends are extended axially through said shell outer end openings into said sockets and rotated; bodies of fluid dielectric material substantially filling the space in said shells between said sockets and said shell outer end opening so as to submerge said sockets therein to a substantial depth, the composition of said material causing any portions thereof which are exposed to oxygen to quickly harden to form a seal, said seal protecting unexposed portions of said material from such exposure; and a substantial but rupturable cover embodied with each of said shells for closing said outer end opening thereof to thereby confine said material in said shell pending use of said splice head in the field, said cable ends, in said field use, being pushed through said covers to form holes therein admitting said cable ends, the latter then being screwed into said sockets, and fluid dielectric material displaced by said cable ends being expelled through said holes, hardens quickly by oxidation thereby sealing the space around said cable ends in said holes.

2. A combination as in claim 1 in which said fluid dielectric material is composed of a blended mixture of suitable consistency of blown soya oil and powdered calcium carbonate and approximately 6 percent of powdered cobalt.

3. A combination as in claim 1 in which said covers comprise hollow, thin-walled, molded plastic plugs frusto-conical in shape, each such plug closing the outer opening of one of said shells, when inserted inwardly in said opening, by the engagement of said opening with a portion of maximum diameter of said plug, the balance of the latter extending into said shell free of contact with said shell, the inner end portion of minimum diameter of said plug comprising a rupturable diaphragm of approximately the same outside diameter as the smallest cable said splice head is designed for use with, cable of larger diameter being rendered admissible through said plug by the frusto-conical portion of said plug walls being expensible to accommodate one of said larger cables when the latter is pushed through said diaphragm.

References Cited in the file of this patent

UNITED STATES PATENTS

| | | |
|---|---|---|
| 1,874,825 | Sommer | Aug. 30, 1932 |
| 1,933,555 | Jasper | Nov. 7, 1933 |
| 2,014,853 | Ley et al. | Sept. 17, 1935 |
| 2,434,475 | Sullivan | Jan. 13, 1948 |
| 2,932,685 | Raila et al. | Apr. 12, 1960 |
| 2,945,203 | Quackenbush | July 12, 1960 |

FOREIGN PATENTS

| | | |
|---|---|---|
| 765,082 | Great Britain | Jan. 2, 1957 |